(12) United States Patent
Yamamoto et al.

(10) Patent No.: US 7,813,875 B2
(45) Date of Patent: Oct. 12, 2010

(54) LAYERED HOST BASED SATELLITE POSITIONING SOLUTIONS

(75) Inventors: Clifford Yamamoto, Gardena, CA (US); Sebastian Nonis, Carson, CA (US); Ashutosh Pande, San Jose, CA (US); Nikola Bulatovic, Mountain View, CA (US); Stefan Witanis, Sunnyvale, CA (US)

(73) Assignee: Sirf Technology, Inc., San Jose, CA (US)

( * ) Notice: Subject to any disclaimer, the term of this patent is extended or adjusted under 35 U.S.C. 154(b) by 915 days.

(21) Appl. No.: 10/269,105

(22) Filed: Oct. 10, 2002

(65) Prior Publication Data

US 2005/0234982 A1    Oct. 20, 2005

(51) Int. Cl.
    G01C 21/00    (2006.01)
    G01C 21/32    (2006.01)
(52) U.S. Cl. ........................ 701/213; 707/760
(58) Field of Classification Search ................ 701/213; 707/760
    See application file for complete search history.

(56) References Cited

U.S. PATENT DOCUMENTS

| | | | |
|---|---|---|---|
| 5,416,712 A | 5/1995 | Geier et al. | |
| 5,497,339 A | 3/1996 | Bernard | |
| 5,506,588 A * | 4/1996 | Diefes et al. ........... | 342/357.11 |
| 5,519,403 A | 5/1996 | Bickley et al. | |
| 5,528,248 A | 6/1996 | Steiner et al. | |
| 5,589,835 A | 12/1996 | Gildea et al. | |
| 5,663,734 A | 9/1997 | Krasner | |
| 5,663,735 A | 9/1997 | Eshenbach | |
| 5,781,156 A | 7/1998 | Krasner | |
| 5,812,087 A | 9/1998 | Krasner | |
| 5,825,327 A | 10/1998 | Krasner | |
| 5,831,545 A | 11/1998 | Murray et al. | |
| 5,831,574 A | 11/1998 | Krasner | |
| 5,832,247 A | 11/1998 | Gildea et al. | |
| 5,841,396 A | 11/1998 | Krasner | |
| 5,874,914 A | 2/1999 | Krasner | |
| 5,884,214 A | 3/1999 | Krasner | |
| 5,920,283 A | 7/1999 | Nicholson et al. | |
| 5,945,944 A | 8/1999 | Krasner | |
| 5,999,124 A | 12/1999 | Sheynblat | |
| 6,002,363 A | 12/1999 | Krasner | |
| 6,016,119 A | 1/2000 | Krasner | |

(Continued)

FOREIGN PATENT DOCUMENTS

JP    6 036190 A    2/1994

OTHER PUBLICATIONS

Infineon Web Page, www.infineon.com, First GPS System Solution, printed from Infineon Web Site on Sep. 23, 2002, 1 page.

(Continued)

*Primary Examiner*—Jacob F Bétit
(74) *Attorney, Agent, or Firm*—K&L Gates LLP

(57) ABSTRACT

Methods and systems consistent with the present invention provide a host based positioning system. The host based positioning system includes a tracker hardware interface that connects to a dedicated hardware space vehicle tracker. The tracker hardware interface receives positioning information from the space vehicle tracker. The host based positioning system includes a layered approach to enable user applications on a host computer to access data from tracker hardware.

30 Claims, 12 Drawing Sheets

U.S. PATENT DOCUMENTS

| | | | |
|---|---|---|---|
| 6,047,258 | A | 4/2000 | Allison et al. |
| 6,052,081 | A | 4/2000 | Krasner |
| 6,057,759 | A | 5/2000 | Marsh |
| 6,061,018 | A | 5/2000 | Sheynblat |
| 6,064,336 | A | 5/2000 | Krasner |
| 6,067,044 | A | 5/2000 | Whelan et al. |
| 6,104,338 | A | 8/2000 | Krasner |
| 6,104,340 | A | 8/2000 | Krasner |
| 6,107,960 | A | 8/2000 | Krasner |
| 6,108,603 | A | 8/2000 | Karunanidhi |
| 6,111,540 | A | 8/2000 | Krasner |
| 6,131,067 | A | 10/2000 | Girerd |
| 6,133,853 | A * | 10/2000 | Obradovich et al. ........ 340/905 |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,209,090 | B1 | 3/2001 | Aisenberg et al. |
| 6,212,133 | B1 | 4/2001 | McCoy et al. |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,255,988 | B1 | 7/2001 | Bischoff |
| 6,256,578 | B1 | 7/2001 | Ito |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,317,687 | B1 | 11/2001 | Morimoto et al. |
| 6,377,209 | B1 | 4/2002 | Krasner |
| 6,377,891 | B1 | 4/2002 | Gilbert |
| 6,384,777 | B1 | 5/2002 | McBurney et al. |
| 6,401,037 | B1 | 6/2002 | Muller et al. |
| 6,408,196 | B2 | 6/2002 | Sheynblat |
| 6,411,254 | B1 | 6/2002 | Moeglein et al. |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,430,503 | B1 | 8/2002 | McBurney |
| 6,433,731 | B1 | 8/2002 | Sheynblat |
| 6,453,237 | B1 | 9/2002 | Fuchs et al. |
| 6,480,146 | B1 * | 11/2002 | Ferrandis et al. ....... 342/357.06 |
| 6,484,097 | B2 | 11/2002 | Fuchs et al. |
| 6,487,499 | B1 | 11/2002 | Fuchs et al. |
| 6,490,521 | B2 * | 12/2002 | Wiener ...................... 701/211 |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 6,611,755 | B1 | 8/2003 | Billings et al. |
| 6,662,103 | B1 * | 12/2003 | Skolnick et al. ............. 701/207 |
| 6,703,971 | B2 * | 3/2004 | Pande et al. ............ 342/357.09 |
| 6,718,409 | B2 * | 4/2004 | Houlberg ..................... 710/62 |
| 2001/0009407 | A1 | 7/2001 | Honda et al. |
| 2002/0002592 | A1 * | 1/2002 | Aoki et al. .................. 709/211 |
| 2002/0029108 | A1 | 3/2002 | Liu et al. |
| 2002/0070881 | A1 | 6/2002 | Tseng et al. |
| 2002/0102988 | A1 * | 8/2002 | Myllymaki ................. 455/456 |
| 2002/0115445 | A1 | 8/2002 | Myllymaki |
| 2002/0196181 | A1 | 12/2002 | Fall |
| 2002/0198658 | A1 | 12/2002 | Tamaka et al. |
| 2003/0234739 | A1 | 12/2003 | Orler et al. |
| 2009/0270110 | A1 * | 10/2009 | Ardalan .................. 455/456.1 |

OTHER PUBLICATIONS

Trimble Web Page, www.trimble.com/firstgps.html, printed from Trimble Web Site on Sep. 23, 2002, 1 page.

Trimble's FirstGPS Architecture: A Better Way to Add Location to Your Product, brochure printed from Trimble's Web Site on Sep. 23, 2002, 4 pages.

Marketing Material: Qualcomm CDMA Technologies—Integrated Solutions—MGP6200™ Multimode GPS Processor (8 pages).

Marketing Material: uNav Microelectronics—uN9×18 Low Power, High Performance GPS Receiver Chipset/uN9×18 GPS Receiver Solution (9 pages).

Marketing Material: uNav Microelectronics, uN9×18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

LAYERED HOST BASED SATELLITE POSITIONING SOLUTIONS

CROSS-REFERENCE TO RELATED APPLICATIONS

This application is related to Ser. No. 10/269,914, titled "HOST BASED SATELLITE POSITIONING SYSTEMS", filed Oct. 10, 2002, and Ser. No. 10/269,104 titled "NAVIGATION PROCESSING IN HOST BASED SATELLITE POSITIONING SOLUTIONS", filed Oct. 10, 2002, both of which are incorporated herein by reference in their entirety.

BACKGROUND OF THE INVENTION

1. Field of the Invention

This invention relates to satellite positioning systems. In particular, this invention relates to satellite positioning systems implemented using the processing power of a host in layered communication with tracker hardware.

2. Related Art

Worldwide use of satellite positioning systems (SPS), such as the Global Positioning System (GPS) is growing at a rapid pace. Current trends are calling for the incorporation of GPS services into a broad range of electronic devices and systems, including Personal Digital Assistants (PDAs), cellular telephones, portable computers, automobiles, and the like. At the same time, manufacturers constantly strive to reduce costs, simply designs and produce the most cost-attractive product possible for consumers.

In the past, providing a GPS solution, such as handheld GPS devices, often required expensive dedicated GPS signal reception and processing hardware, as well as dedicated post processing hardware for resolving location measurements, displaying location coordinates, updating map displays, and the like. However, given the rapid growth in speed, sophistication, and processing power of the host microprocessors present in the host computer devices (e.g., in a cell phone, personal digital assistant or automobile), the possibility exists for allowing the host computer to bear the burden not only of running its regular applications, but also to operate as part of the GPS solution. Such an approach is presented in U.S. Pat. No. 6,430,503, titled "Distributed GPS Navigation System", the entirety of which is incorporated herein by reference in its entirety.

Currently, however, there is a strong push toward incorporating GPS solutions in many electronic devices designed by numerous manufacturers. Of course, each device varies considerably in architecture, operating system, hardware interfaces, and the like. Prior GPS solutions did not provide the flexibility that allowed the solutions to be adapted to a wide range of electronic devices. Instead, expensive customized solutions were needed for each device, thereby undesirably increasing costs and delaying the introduction of GPS services into a wide range of devices. The prior GPS host solutions also rely on interrupts to the host computer in order to service a GPS function. The use of interrupts adversely impacts the performance of the host computer.

Known GPS solutions are often developed or customized for specific devices and applications. Such customization increases the complexity of implementing GPS systems on numerous platforms and operating systems. Further, known GPS systems are often not able to take advantage of changes in software and hardware without changing a large portion of the software in a GPS device. The customized or specific device design approach also limits the ability to create application program interfaces that can be marketed and delivered separate from the GPS hardware.

Therefore, a need exists for implementations of GPS solutions that overcome the problems noted above and others previously experienced.

SUMMARY

Methods and systems consistent with the present invention provide a layered host based SPS solution. The SPS is a GPS solution implemented in a layered form that is flexible and extensible, and that can be adapted to meet the needs of many different platforms. As a result, a wide variety of electronic devices may incorporate GPS functionality with less expense using less development time.

In one implementation, a host based positioning system includes host computer system that connects through a tracker hardware interface to a dedicated hardware space vehicle tracker. The host processing system also uses a layered approach having a user application layer, communication processing layer, client-server interface processing layer, user interface manager and protocol layer, navigation processing layer, and tracker interface layer. A processor in the host processing system runs the positioning engine and the functions provided by the different layers.

The tracker hardware interface receives positioning information from the space vehicle tracker (tracker hardware). Through functions in the tracker interface, the location data is communicated to the host computer.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
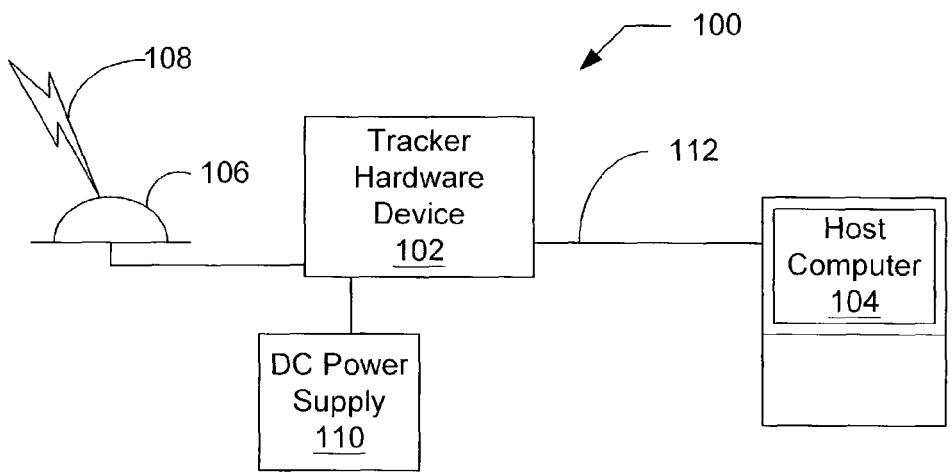
FIG. 1 is a diagram of an exemplary positioning system implemented as a layered host computer based GPS solution having tracker hardware in communication with a host.

The invention may be better understood with reference to the following figures. The components in the figures are not necessarily to scale, emphasis instead being placed upon illustrating the principals of the invention. Moreover, in the figures, like reference numerals designate corresponding parts throughout the different views.

In FIG. 1, a diagram of an exemplary positioning system 100 implemented as a layered host based satellite positioning system with a GPS solution having tracker hardware 102 in communication with a host computer 104 is shown. The tracker hardware 102 is connected to a GPS antenna 106 capable of receiving multiple GPS signals 108 from a plurality of satellites. The tracker hardware 102 is also depicted as being connected to a DC power supply 110. The tracker hardware 102 communicates with the host computer 104 over a hardware tracker interface link 112. Examples of the hardware tracker interface link 112 include, but are not limited to, a serial connection (including a universal serial bus (USB), a small computer serial interface (SCSI)), a parallel connection, and a wireless connection (including RF connections and infrared connections).

The tracker hardware 102 may be receive power from the DC power supply 110 that is separate from the power supply of the host computer 104, or in an alternate embodiment may receive power from the host computer 104 via the hardware tracker interface link 112. Further, the GPS antenna 106 may be separate from the tracker hardware 102 or integrated within the same housing as the tracker hardware 102.

Figure 2:
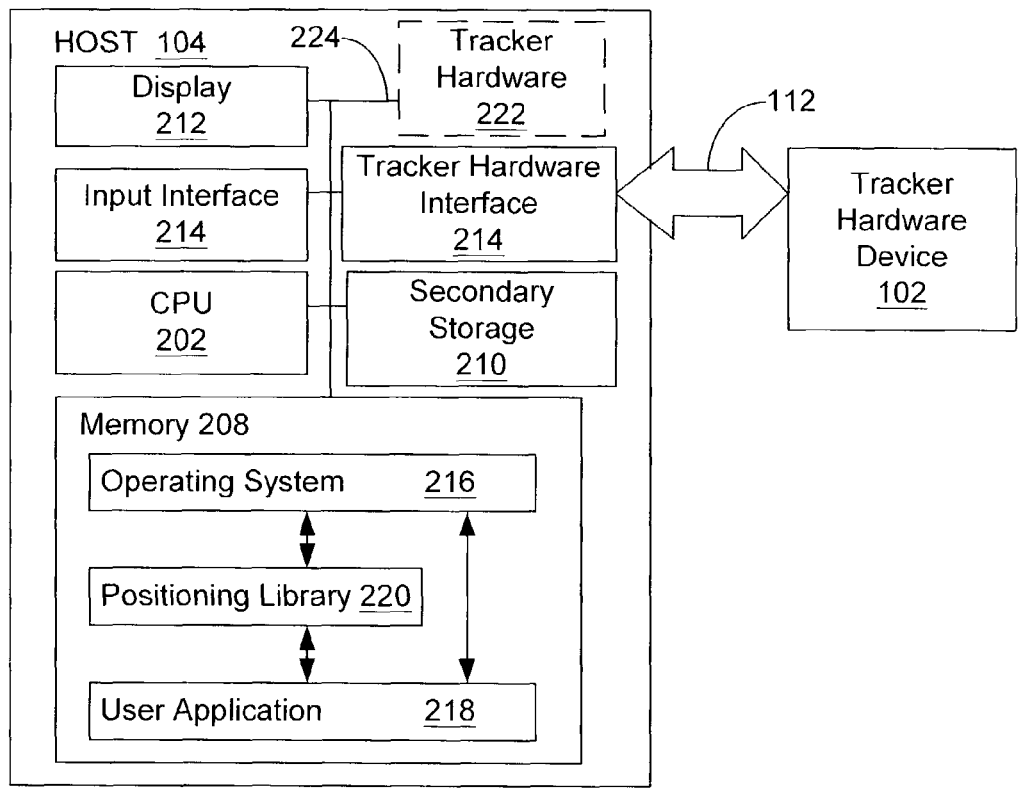
FIG. 2 is a block diagram of the exemplary positioning system of FIG. 1.

Turning to FIG. 2, a block diagram of the exemplary positioning system of FIG. 1 is shown. The computer host 104 includes a central processing unit (CPU) 202, a hardware tracker interface link 112, and a memory 208. The CPU 202 is a controller and may be implemented as a microprocessor, embedded controller, application specific integrated circuit (ASIC), discrete logic circuits acting as a controller, analog circuits acting as a controller, and a combination of discrete logic and analog circuits. The host computer 104 also includes a secondary storage device 210, and a display 212, and an input interface 214 (e.g., a mouse, keyboard, and the like).

An operating system 216 (e.g., Windows CE, Palm OS, UNIX, QNX, or the like) is a plurality of instructions that reside in and are executed from memory 208. A plurality of user applications 218 communicates with a positioning library 220 and the operating system 216. One of the user applications 218 may receive position information from the positioning library 220, and may also communicate commands to the positioning library 220. The user application 218 may be virtually any program that uses positioning information, including, as examples, a mapping program, course charter, location aid, and the like.

The host computer 104 connects through the hardware tracker interface 214 and the interface connection 112 to the tracker hardware 102. The hardware tracker interface 214 may be virtually any type of data transfer interface (as examples, a serial, parallel, PCMCIA card, USB, PC Card, or network interface). In one implementation, the hardware tracker interface 214 is an RS232 port running at 38,400 bps, N-8-1 that communicates up to 2 KB of data per second between the tracker hardware 102 and the computer host 104.

In other implementations, the tracker hardware (as illustrated by the reference numeral 222) is more closely incorporated into the host computer 104. Thus, rather than connecting to the computer host 104 through the interface connection link 112, for example, the tracker hardware 222 may be directly coupled to the host computer 104 via address, data, and control buses 224. As will be explained in more detail below, the host computer 104 receives and processes navigation information from the hardware tracker 102, or in an alternate embodiment 222 in order to provide the plurality of user applications 218 with position information.

Although aspects of the present invention are depicted as being stored in memory 208, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of positioning system 100 are described, one skilled in the art will appreciate that a positioning system suitable for use with methods, systems, and articles of manufacture consistent with the present invention may contain additional or different components.

Figure 3:
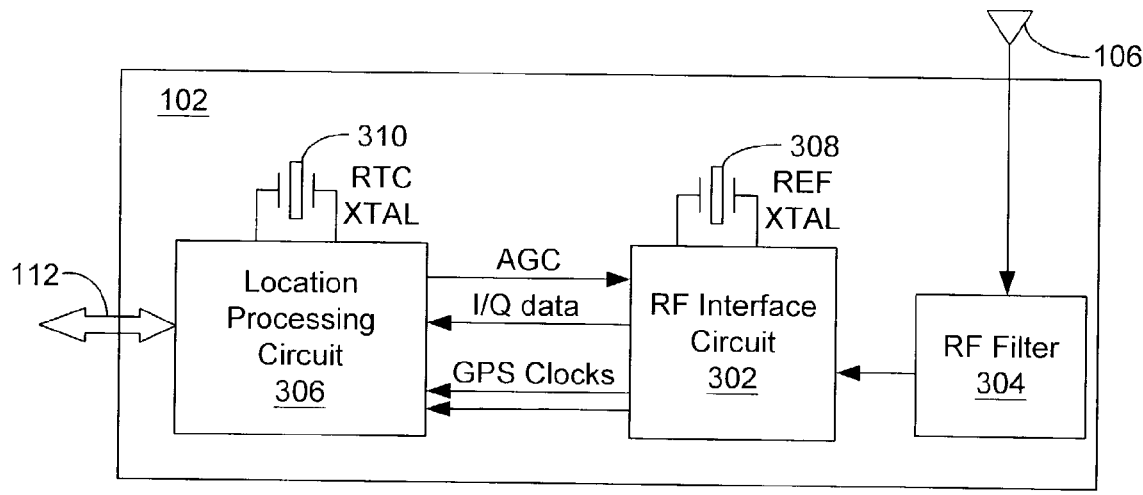
FIG. 3 illustrates the tracker hardware of FIG. 2.

In FIG. 3, the tracker hardware 102 of FIG. 2 is illustrated. The tracker hardware 102 acquires and tracks GPS satellites and sends raw measurement data to the host computer 104 for position calculation. To that end, the tracker hardware 102 includes an antenna 106 for receiving GPS satellite signals 108 that are filtered by a radio frequency (RF) filter 304 for passing the signals to the RF interface circuit 302. The RF interface circuit 302 processes the signals, produces 2-bit Inphase and Quadrature (I/Q) signals and recovers GPS clocks. The RF interface circuit 302 provides the I/Q signals and GPS clocks to the location processing circuit 306 for digital processing. A reference frequency source 308 (e.g., a crystal oscillator) provides a reference clock for the RF interface circuit 302, while the real time clock (RTC) source 310 provides a reference clock for the location processing circuit 306.

The tracker hardware 102 may be implemented with components available from SiRF Technology, Inc. of San Jose, Calif. For example, the RF interface circuit 302 may be implemented as a GRF2i/LP integrated circuit. The location processing circuit 306 may be implemented, as examples, as a GSP2t integrated circuit or GSP2e integrated circuit. The tracker hardware 102 minimizes the overhead on the host computer 104 and operating system 216 by keeping low the maximum transmission rate of raw measurements to the host computer 104 (e.g., one measurement per second).

Figure 4:
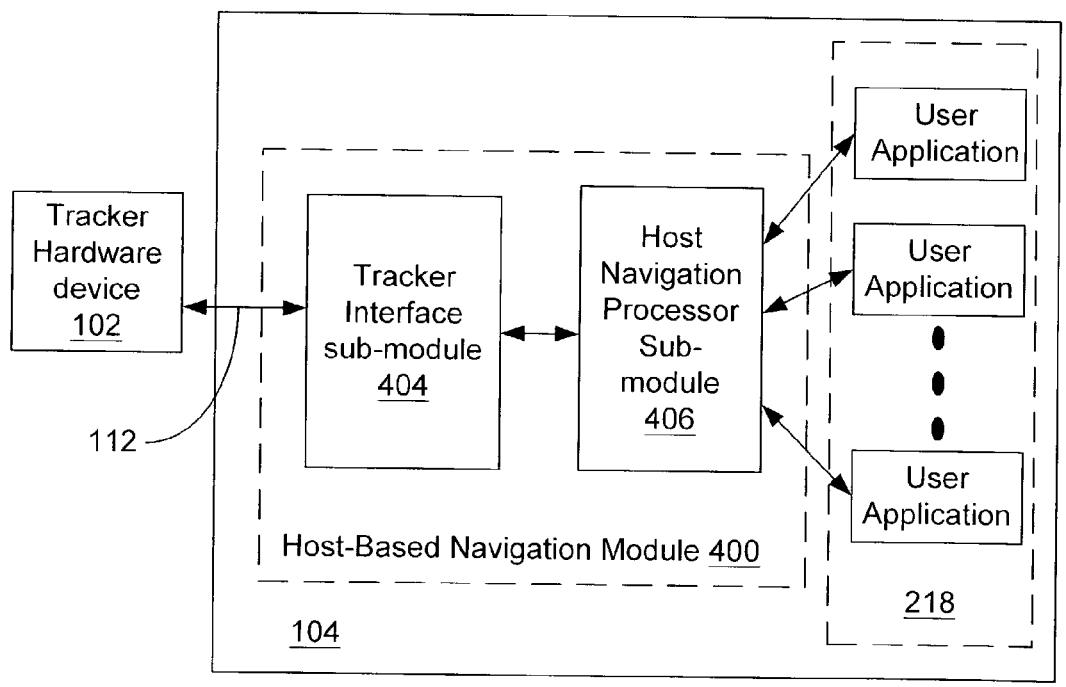
FIG. 4 depicts a host-based navigation nodule located in the host computer of FIG. 2 in communication with a plurality of user applications.

In FIG. 4, a host-based navigation module 400 located in the host computer 104 of FIG. 2 in communication with a plurality of user applications 218 is shown. The host based navigation module 400 may be located in memory 208. The host-based navigation module 400 is generally composed of two sub-modules. The first is the tracker interface module 404 and second is the host navigation processing sub-module 406.

The tracker interface sub-modules 404 communicate with the tracker hardware 102 via the hardware tracker interface (214, FIG. 2) and the host navigation processing sub-module 406. The tracker interface sub-module 404 sends and receives messages over the serial interface with the tracker module 102. Examples of the messages, include a predefined initialization message, status message and location data message. The location data received from the tracker hardware 102 by the tracker interface module 404 is made available to the host navigation processing module 406 in predefined data structures. Such data structures may contain fields for latitude, longitudes, and time and take the form of a predefined array of data.

Each of the plurality of user applications may expect data in one of a plurality of location data standards. Such location or position standards include, but are not limited to; different versions of NMEA183 location data and binary location data. Each of the user applications 218 may require a different format for location data. The host navigation processor sub module 406 receives location data via a data structure from the tracker interface module 404 and formats the data for the user applications 218. The host navigation process sub module 406 also manages communication with the user applications 218 with assistance from the operating system. An example of such communication is pipes in an UNIX operating system.

Figure 5:
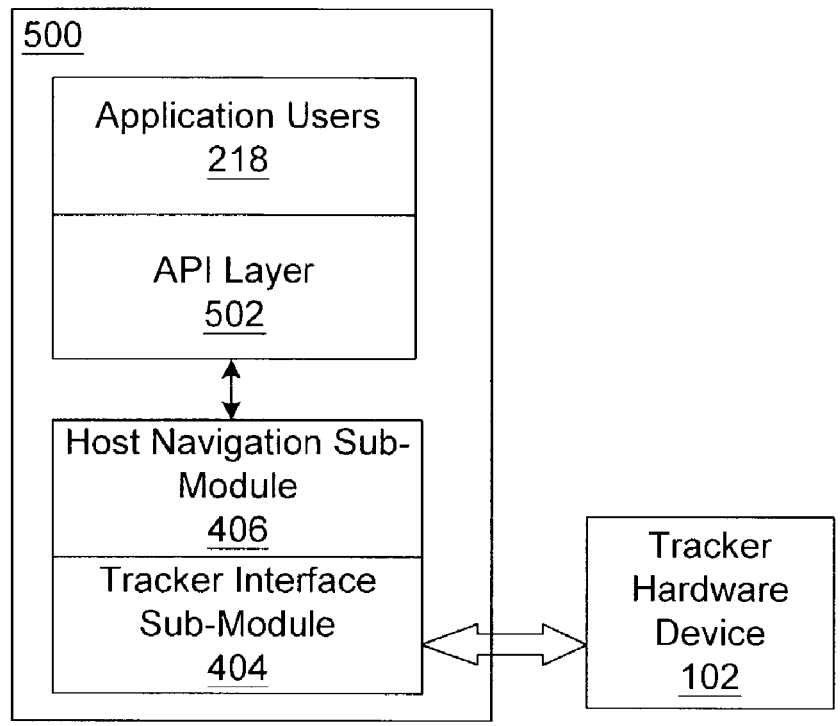
FIG. 5 is a graphical representation of an application program interface between a user application located on the host computer and the tracker hardware of FIG. 2.

Turning to FIG. 5, a graphical representation 500 is illustrated of an application program interface (API) layer 502 between user applications 218 located on the host computer 104 and the tracker hardware 102 of FIG. 2. The API layer 502 is a plurality of predefined functions calls that are available for use by user applications 218 to access software functions in the host navigation processing sub module 406. The API allows a common interface for user application developers while keeping the implementation details of the host-based navigation module 400 separate from the user applications 218 and common across operating systems. An example of API functions calls include, but are not limited to, status, location update and initialization. As described, in FIG. 4, the host navigation sub-module 406 communicates with the tracker interface sub module 404 in order to receive location data from the tracker hardware 102.

Figure 6:
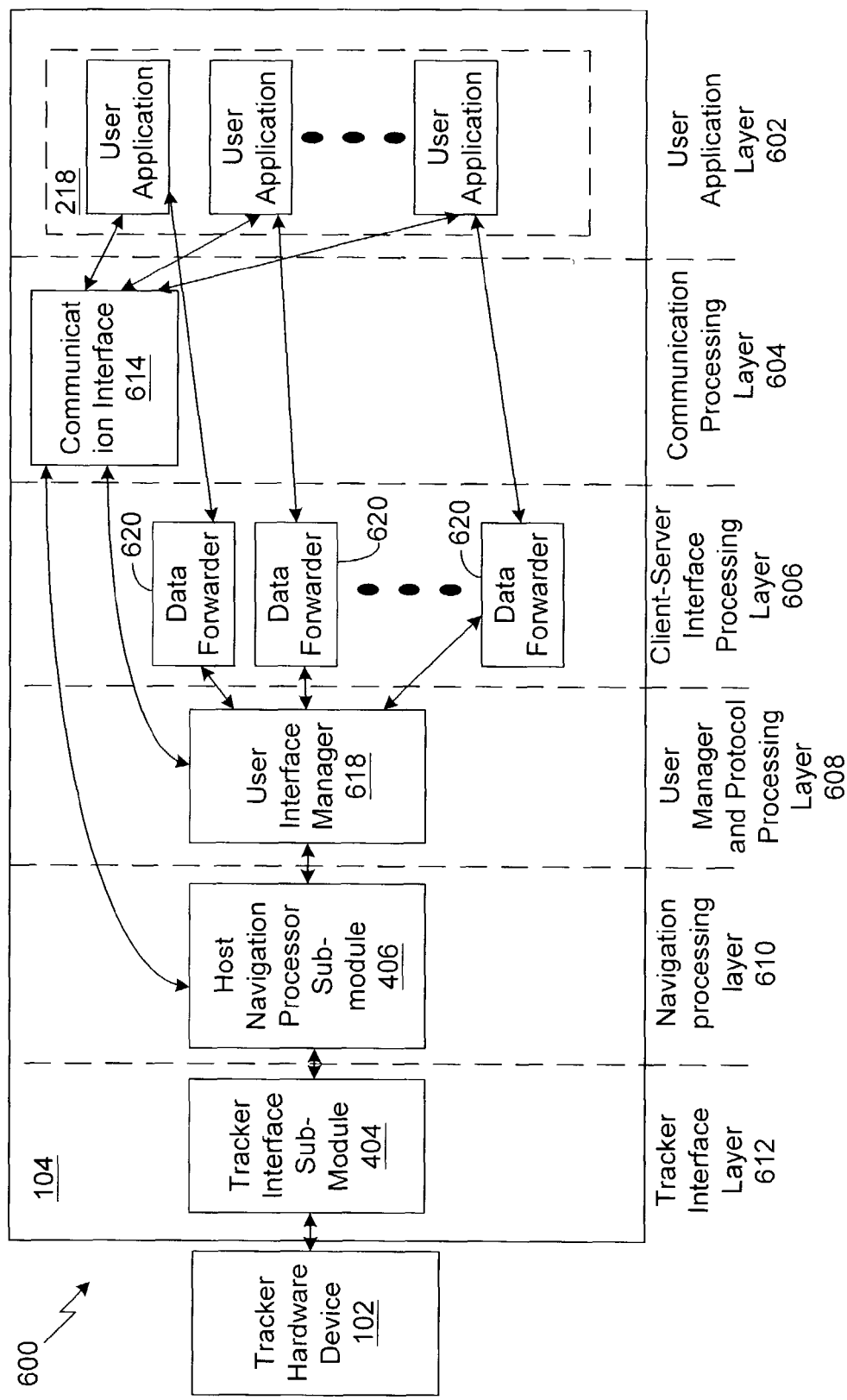
FIG. 6 is a graphical representation of the different layers involved with a user application on the host computer communicating with tracker hardware of FIG. 5.

FIG. 6 is a graphical representation 600 of the different layers involved with user applications 218 on the host computer 104 communicating with tracker hardware 102 of FIG. 5. The communication between user applications 218 and the tracker 102 is divided into six layers, user application layer 602, communication interface processing layer 604, client-server interface processing layer 606, user manager and protocol processing layer 608, navigation processing layer 610, and tracker interface layer 612.

User applications 218 in the user application layer 602 communicate with a communication interface 614 via an API. In response to initiation of each of the user applications 218, the communication interface 614 notifies the host navigation sub module 406 in the navigation processing layer 610 and the user interface manager 618 in the user manager and protocol processing layer 608. The host navigation processing sub-module 406 then provides the appropriate location data for the user application 218 to the user interface manager 618. The user interface manager 618 communicates with the communication interface 614 in order to forward the appropriate location data to a required data forwarder 620. The data forwarder 620 formats the location data for one of the respective user applications 218. The formatted location data is then sent to the user application 218 that requires the location data.

Thus, the ability to have numerous user applications 218 accessing tracker hardware 102 is accomplished through a layered approach. Further, the communication manager 614 in conjunction with the host navigation processor sub module 406 and the user interface manager 618 enable multiple user applications 218 to have diverse location data formats while still sharing common resources and software code.

Figure 7:
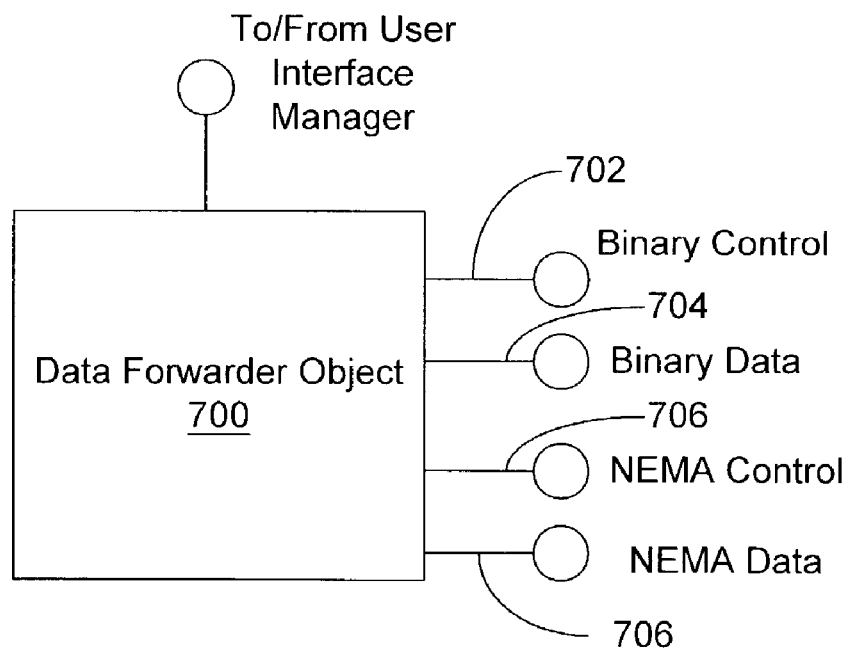
FIG. 7 is a block diagram of a data forwarder in the client server interface-processing layer of FIG. 6.

Turning to FIG. 7, a block diagram of a data forwarder 620 in the client server interface-processing layer 606 of FIG. 6 is shown. In general, the data forwarder 620 receives data from the user interface manager 618 (or when the manager 618 is not present, from the navigation module 406) and prepares the data for delivery to a given user application 218. To that end, the data forwarder 620 may accept data in a predefined format used by the navigation module 406 and prepare the data for delivery to a user application 218 in the protocol expected by the user application 218. As an example, the data forwarder 620 may prepare the data for delivery to the user application 218 in NEMA format or binary format. The data forwarder 620 may be implemented as a data forwarder object 700 in a high level computer software language, such as "C++" or Smalltalk. The data forwarder object 700 is able to communicate with the user interface manager 618. The location data from the user interface manager 618 results in the polymorphism of the data forwarder object 700 for the different types of location data output, such as for binary control 702 and binary data 704 or for NMEA control 706 and NMEA data 708. In an alternate embodiment, different instances of data forwarders 620 may be dedicated to specific types of location data formatting.

Figure 8:
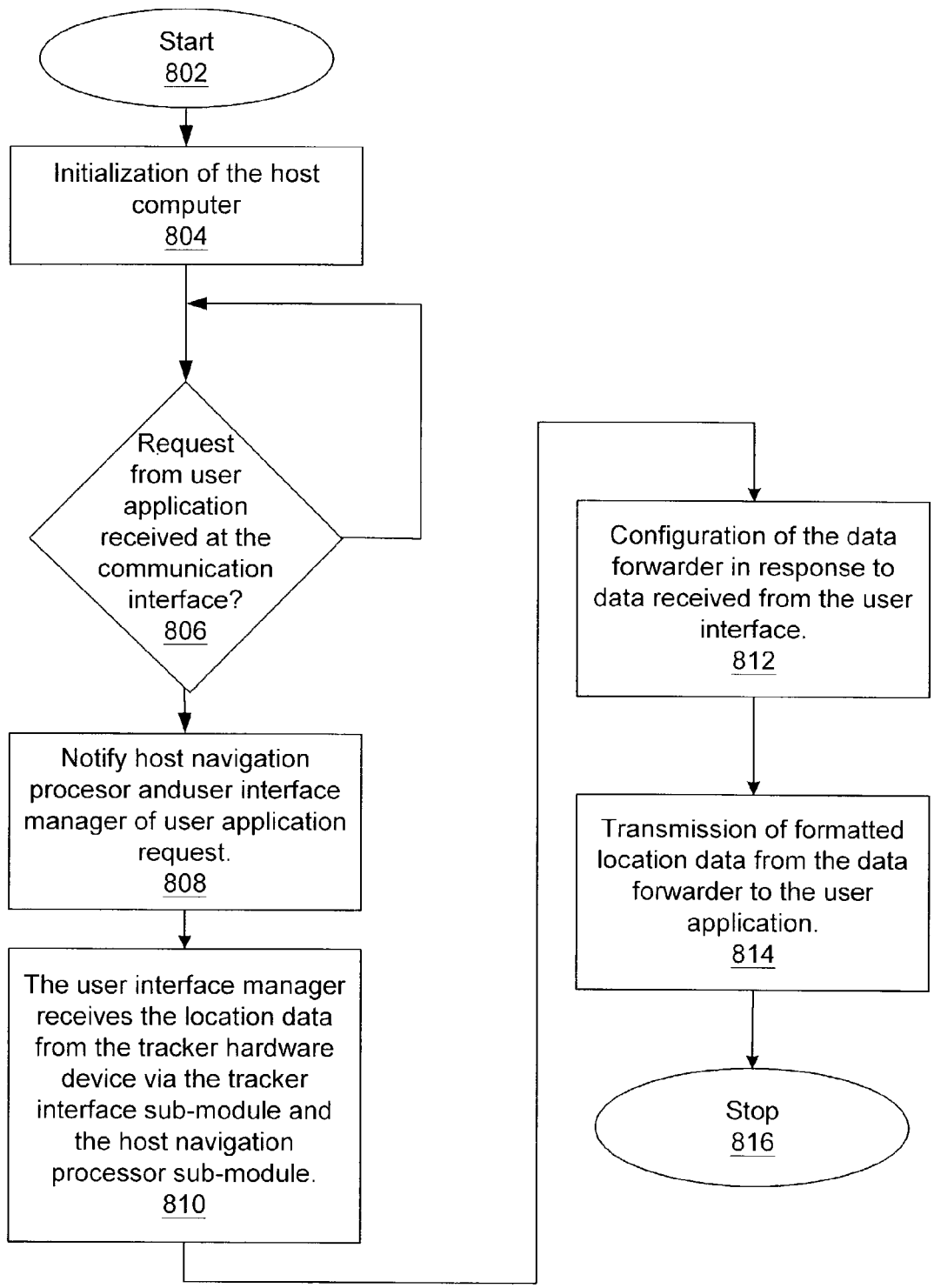
FIG. 8 is a flowchart of the process for the user application 218 to communicate with the tracker hardware 102 of FIG. 6.

In FIG. 8, a flowchart 800 of the process for the user application 218 to communicate with the tracker hardware 102 of FIG. 6 is illustrated. The process starts 802 with the initialization of the host computer 104 in step 804. In step 806, a determination is made as to whether a request from the user application 218 is received at the communication interface 614. If a request is received in step 806, then in step 808 the communication interface 614 notifies the host navigation processor 406 and the user interface 618. Otherwise, step 806 is repeated until a request from a user application 218 is received.

The user interface manager 618, in step 810, receives the location data from the tracker hardware 102 via the tracker interface sub module 404 and the host navigation processor sub module 406. In step 812, the data forwarder 620 is configured in response to data from the user interface manager 618. The data may be in the form of location data, or in an alternate embodiment in the form of an instruction. In yet another embodiment the data may be a combination of location data and an instruction.

The data forwarder 620 formats the location data for transmission to the user application 218 in step 814. Thus, the procedure of sending data between the tracker hardware 802 and user application 218 via the multiple layers of processing is complete in step 816 when the data arrives at the user application 218.

It is appreciated by those skilled in the art that the process shown in FIG. 8 may selectively be implemented in hardware, software, or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

Figure 9:
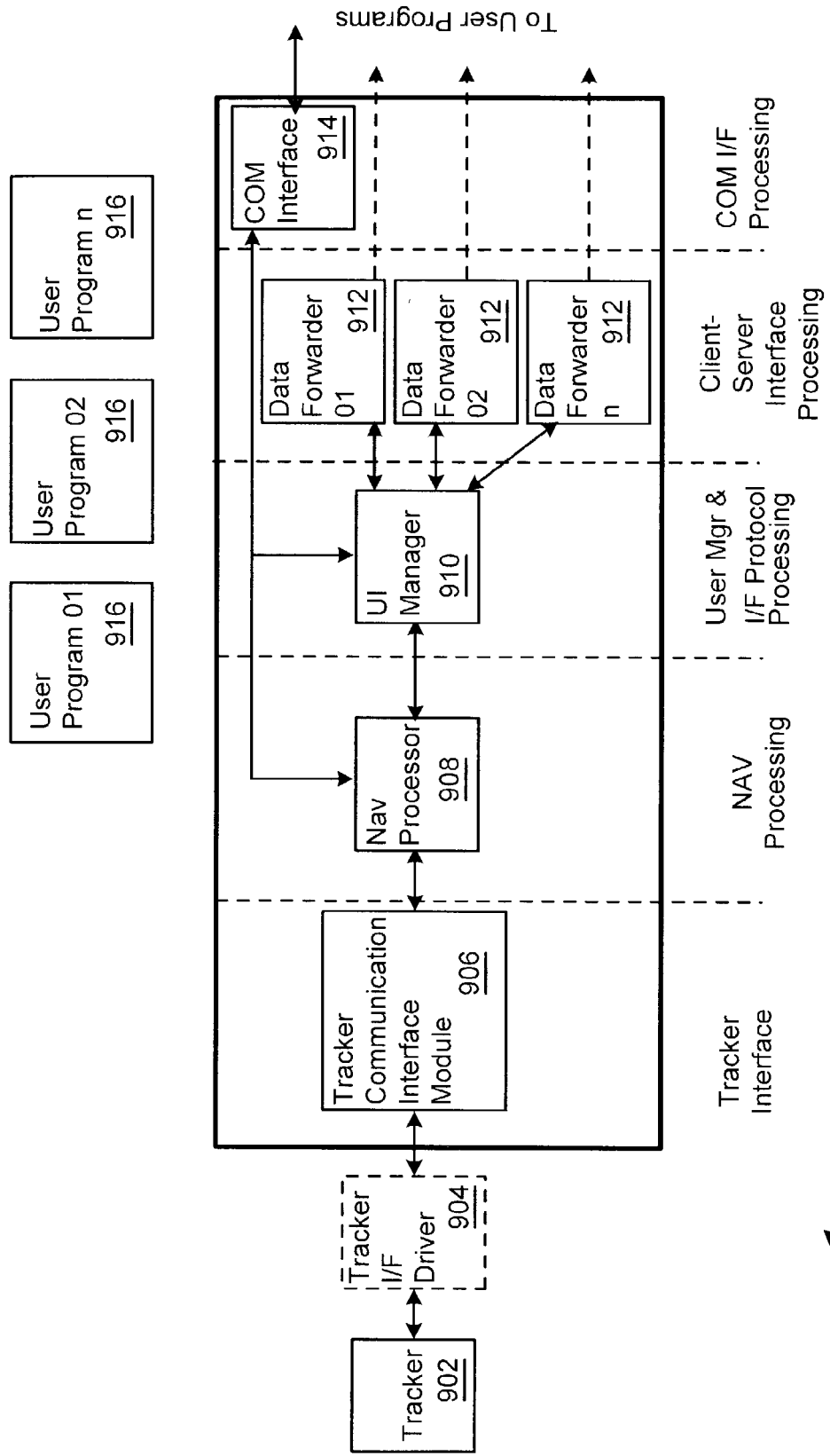
FIG. 9 depicts a software module organization and interaction diagram for the host based navigation module.

Turning next to FIG. 9, a software module organization and interaction diagram 900 for the host based navigation module is shown. The diagram 900 shows the tracker 902 in communication with an optional tracker interface driver 904. The driver 904 communicates with the interface module 906 that, in turn, sends and receives data from the navigation processor module 908. The navigation processor module 908 provides navigation solutions (e.g., position, velocity, and time) to the optional user interface manager 910. The user interface manager 910 directs the navigation solutions to the data forwarders 912, and to the COM interface 914.

The tracker interface driver 904 and interface module 906 may be tailored to any particular host system. For example, the tracker interface driver 904 may be Windows CE serial interface functionality, while the interface module 906 may be tailored to accepting and processing data in any particular format provided by the tracker 902 and the interface driver 904. The navigation processor module 908 communicates with the tracker 902 and produces SPS data and status information from the data received from the tracker 902. In turn, the user interface module 910 forwards the data and status information to a user application 916 that has requested the data.

Figure 10:
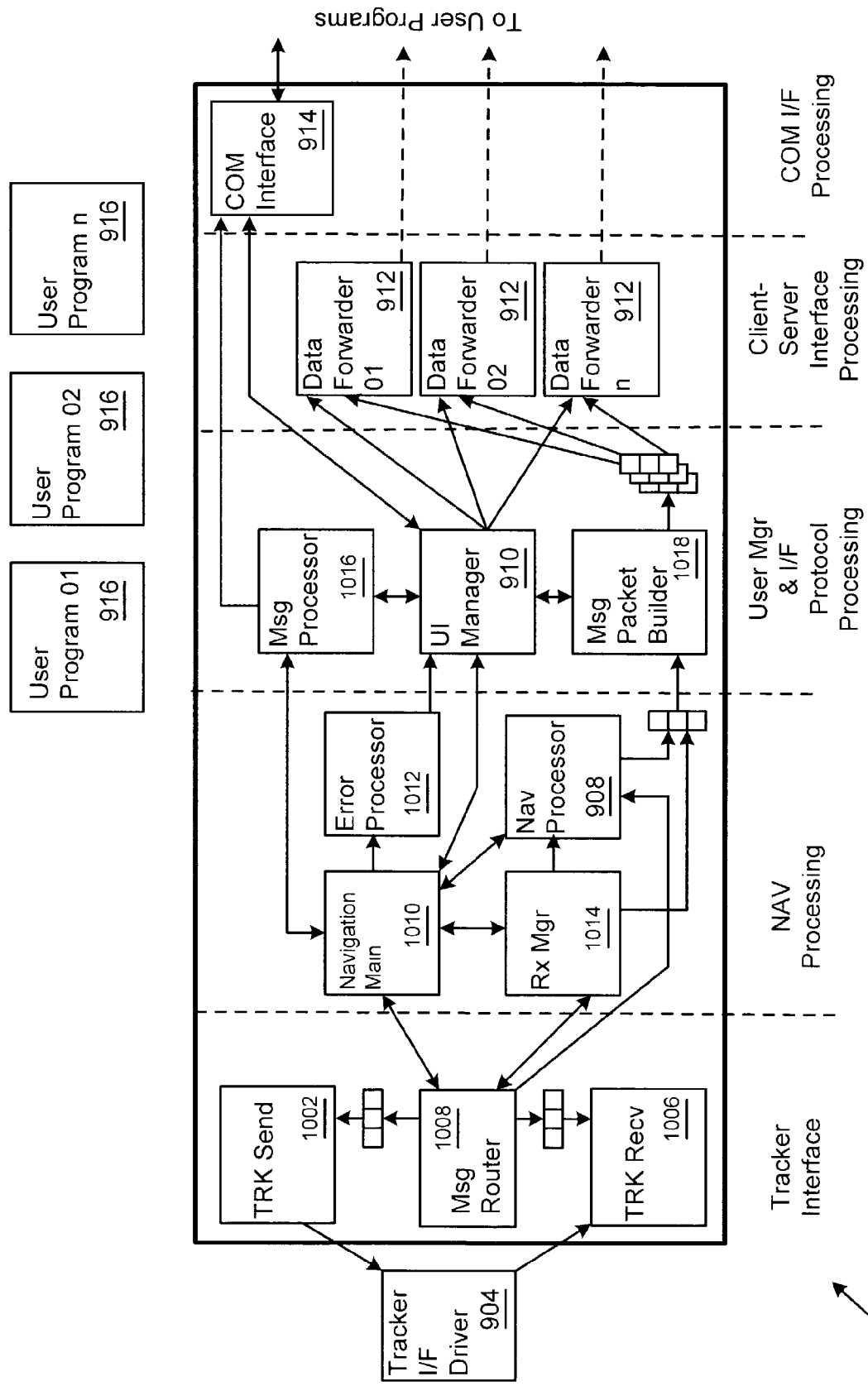
FIG. 10 depicts a software task organization and interaction diagram for a host based navigation module.

FIG. 10 depicts a software task organization and interaction diagram for a host based navigation module shown in FIG. 9. In the tracker interface module, the interface driver 904 communicates with a tracker send module 1002 (that sends messages from the illustrated transmit queue to the tracker) and a tracker receiver module 1004 (that receives messages from the tracker and places them on the illustrated receive queue). The message router module 1008 places messages to be sent on the transmit queue or pulls messages from the receive queue.

In the navigation processing module, the receive manager module 1014 generally receives the messages sent from the message router module 1008 and forwards them to the navigation processor module 908 for processing. In certain instances, however, the message router module 1008 may instead send messages directly to the main module 1010 (generally for messages that do not need to be processed by the navigation processor module 908). The error processor module 1012 checks messages for errors and generates responsive messages that inform the navigation module that an error is present.

In the user manager module, the message packet builder 1018 is provided to create any preselected packet structure for messages to be delivered to the data forwarders 912 through the illustrated queues. In addition, the message processor module 1016 is available to accept messages from the main module 1010, determine if the messages should be routed through the COM module 914, and if so, send the messages.

Figure 11:
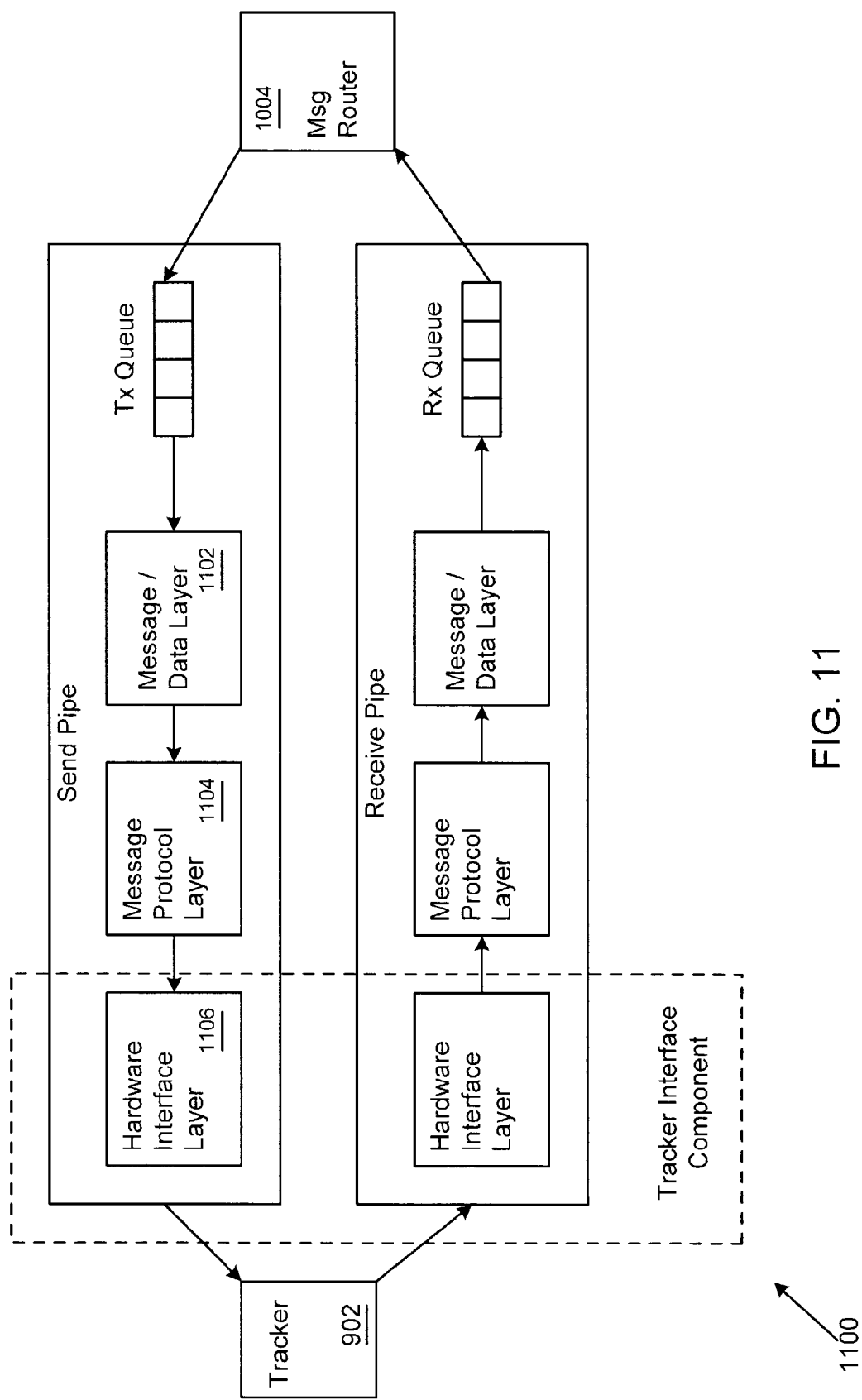
FIG. 11 shows a layered pipelined architecture of a hardware tracker communication interface module.

With regard next to FIG. 11, the Figure shows a layered pipelined architecture 1100 of a hardware tracker communication interface module. In the send pipe, a transmit queue buffers messages from the message router 1004. Messages are removed from the transmit queue by the message/data layer 1102 that extracts the data from the message and passes the data to the message protocol layer 1104. The message protocol layer 1104 wraps the data in packets according to any pre-selected protocol, and forwards the packets to the hardware interface layer 1106 (e.g., a serial device driver) for transmission. A similar process occurs in the receive direction, with the hardware interface layer 1106 receiving messages from the tracker 902 and sending the messages to the protocol layer 1104. The protocol layer 1104 then removes the packet structure from the data, and passes the data to the message/data layer 1102. The message/data layer 1102 then determines (e.g., based on a data header) what data structures to place the data into, and places the data structures on the receive queue.

Figure 12:
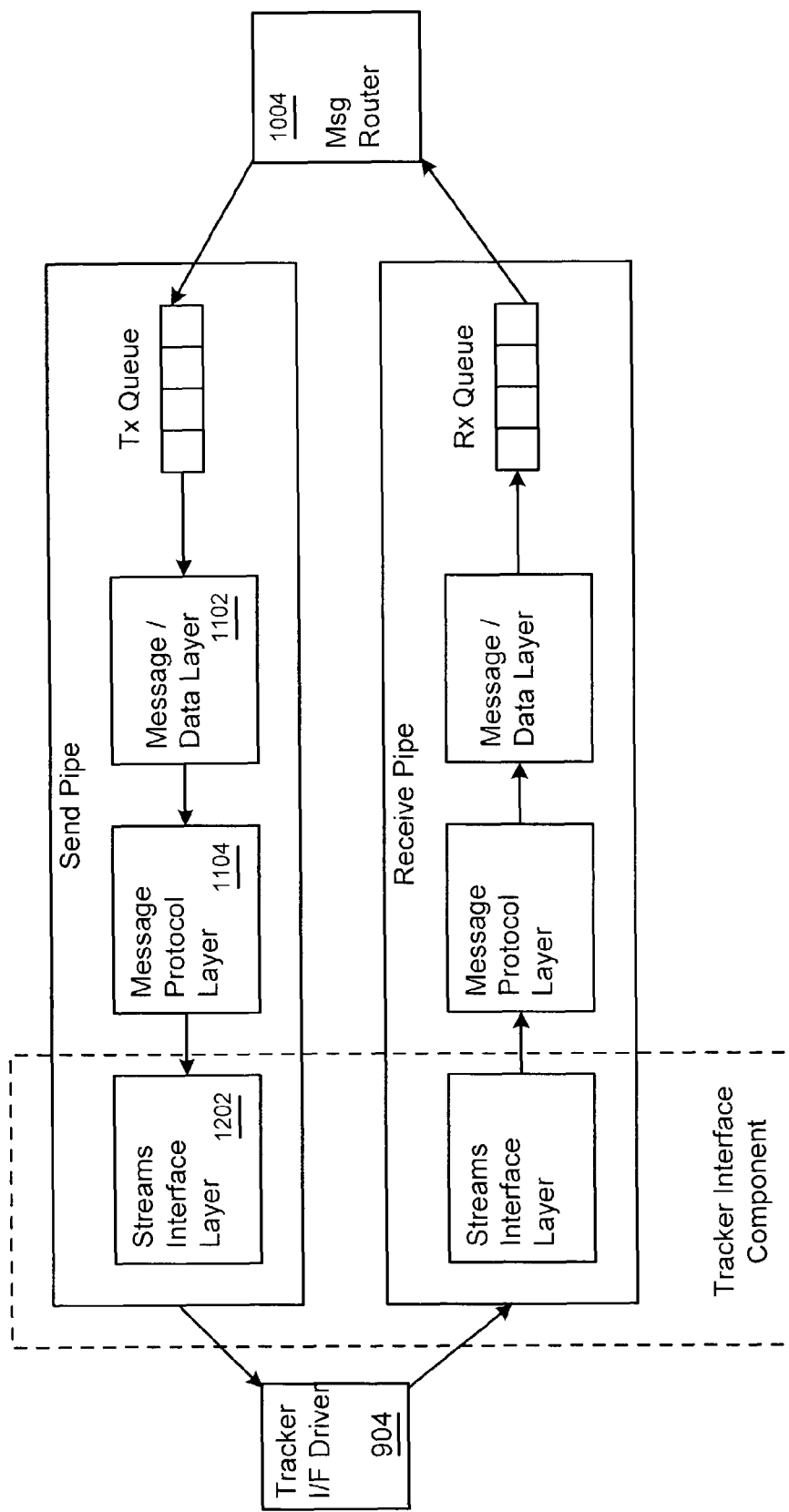
FIG. 12 shows a layered pipelined architecture of a hardware tracker communication interface module using a Streams interface.

The hardware interface layer 1106 may be replaced or configured to support any desired hardware interface. For example, FIG. 12 shows a second example of a layered pipelined architecture 1200 of a hardware tracker communication interface module. In the architecture 1200, the hardware interface layer 1106 is specifically a Streams interface layer 1202 for operating systems that support the Streams paradigm. As shown, the Streams interface layer 1202 communicates with the interface driver 904.

Figure 13:
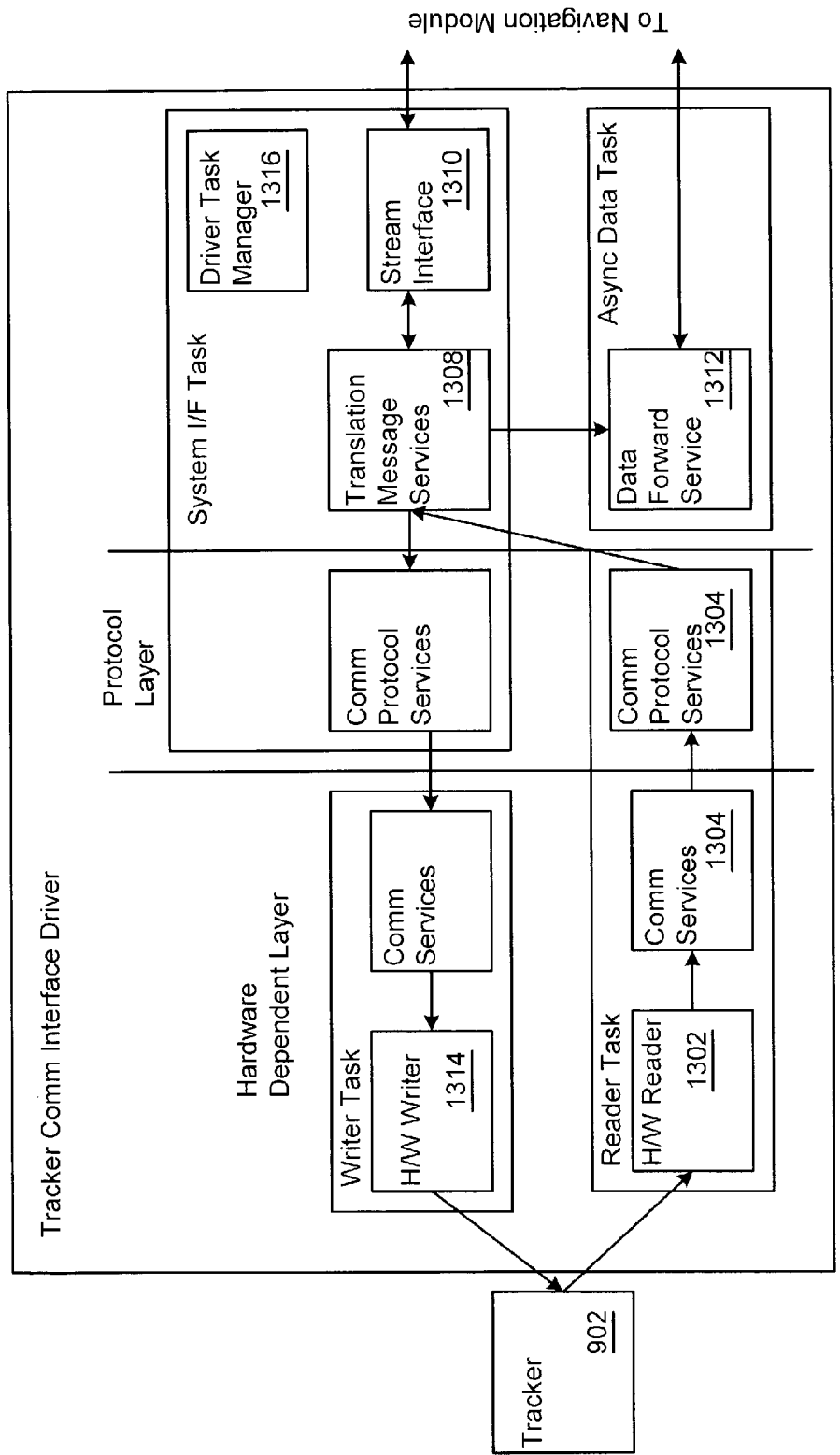
FIG. 13 depicts a layered multitasking stream interface device driver.

FIG. 13 depicts an implementation of a layered multitasking stream interface device driver 904. In general, the tracker 902 communicates with a hardware reader module 1302 and a hardware writer module 1314 that communicate directly with the hardware interface. The hardware reader module 1302 sends the received data to the communication services module 1304 that may, as examples, perform services such as error checking and queuing, in preparation for reception of the data by the communication protocol services module 1306. The protocol services module 1306 applies any protocol specific processing for the data it receives and forwards the data to the message translation services module 1308. In turn, the message translation services module 1308 may forward the data to the Stream interface 1310 or the data forwarding service 1312 that runs asynchronously in the background. Both the Stream interface 1310 and the forwarding service 1312 send data to a specified module in the navigation processing layer. The driver task manager module 1316 performs housekeeping functions for the driver 904.

Figure 14:
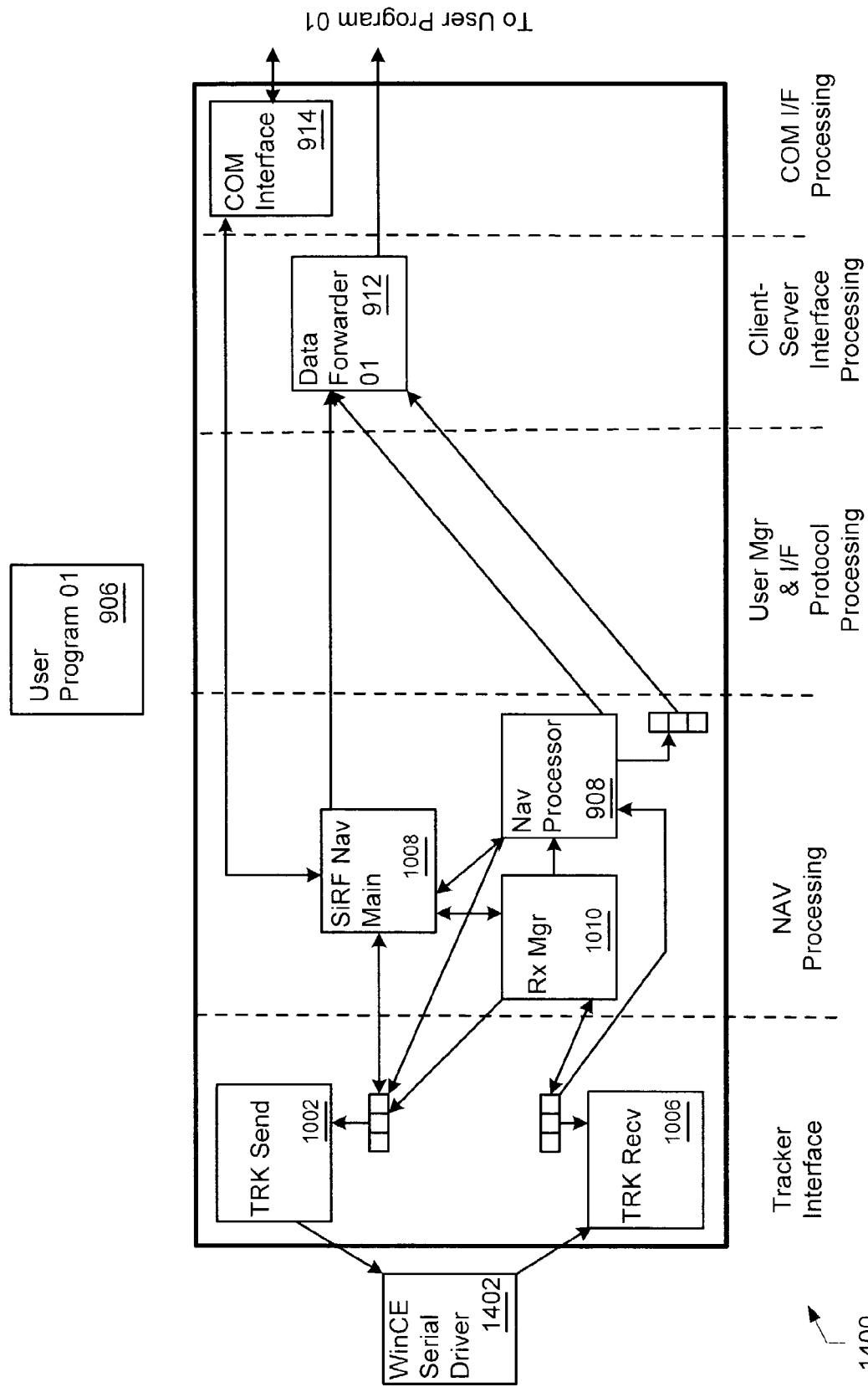
FIG. 14 illustrates a software task organization and interaction diagram for a host based navigation module on a Windows CE platform.

FIG. 14 illustrates a software task organization and interaction diagram 1400 for a host based navigation module on a Windows CE platform. In this implementation, the driver that communicates with the tracker send module 1002 and the tracker receiver module 1006 is depicted as a WinCE serial driver 1402. Note that when there are not multiple user applications to interact with, the layered host based navigation module may omit, if desired, certain modules. As shown in FIG. 14, the user interface manager modules have been omitted (because there is no need to track or interact with or direct messages to multiple user applications). Also, a single data forwarder 912 converts data from the navigation processor 908 to the appropriate protocol for the user program 906.

Figure 15:
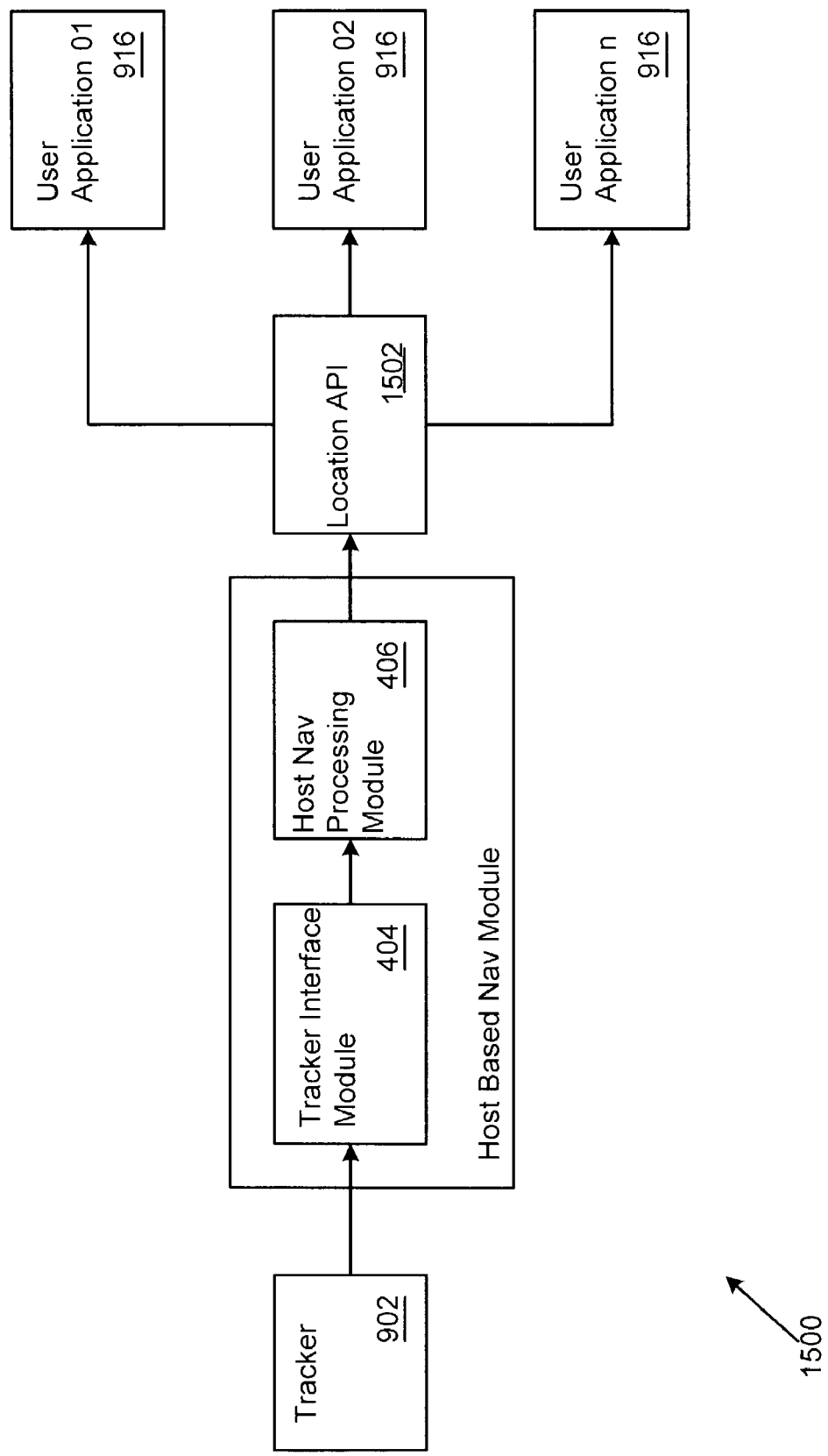
FIG. 15 shows a host based navigation module implementation using a location application programming interface.

FIG. 15 shows a host based navigation module implementation 1500 using a location application programming interface. Thus, for example, the host navigation processing module 406 discussed above may communicate through an operating system provided application programming interface (API) 1502. For example, the API 1502 may be a location API that provides SPS location functions for the user programs 916. The location API 1502 thereby resides between the user programs 916 and the host navigation processing module 406 and operates in accordance with its predefined API specification to establish SPS related communication between the user programs 916 and the processing module 406.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A system for processing positioning signals, the system comprising:
   a tracker having a GPS receiver enabled to receive GPS signals;
   a user interface manager to receive location data from the tracker in a predefined data format;
   a communication interface to enable a plurality of user applications access to the tracker through one of a plurality of communication protocols, wherein at least one user application from the plurality of user applications requires location data delivered in a communication protocol format that is different from a communication protocol format required by at least one other user application; and
   a data forwarder configured by the user interface manager in response to the communication interface receiving a request for location data from one user application from the plurality of user applications, wherein the user interface manager transmits the location data received by the tracker to the data forwarder for transmission to the user application, wherein the location data is received by the data forwarder in the predefined data format and is formatted by the data forwarder for delivery of location data to the requesting user application in a communication protocol format required by the requesting user application in response to a communication protocol format required by the requesting user application, wherein the communication protocol format is selected from a plurality of different communication protocol formats;
   wherein the data forwarder comprises a location data protocol format selected from a plurality of location data protocol formats in response to receipt of an indication of protocol format from the user interface manager.

2. The system of claim 1, further comprising:
   a host navigation processor in receipt of unformatted location data from the tracker via a tracker interface module and communicating the unformatted location data to the user interface manager.

3. The system of claim 1, wherein the user interface manager further comprises:
   a location data communication protocol format selected from a plurality of location data communication protocol formats by the user interface manager in response to a request from the communication interface that results in the unformatted location data being formatted in accordance with the location data communication protocol format.

4. The system of claim 3, wherein the location data protocol format is a NMEA location data protocol format.

5. The system of claim 3, wherein the location data communication protocol format is a binary location data communication protocol format.

6. A method for processing positioning signals, the method comprising:
   receiving at a communication interface a request from a user application of a plurality of user applications for location data formatted in a location data communication protocol format requested by the user application, wherein at least one user application requires a location data communication protocol format that is different from the location data communication protocol format required by at least one other user application;
   notifying a host navigation processor module and a user interface manager of the request for location data formatted in the requested location data communication protocol format sent by the communication interface;
   receiving GPS-based location data at the host navigation processor module from a tracker interface module;
   formatting the location data into the requested location data communication protocol format required by the requesting user application at a data forwarder as directed by the user interface manager in response to the communication interface receiving the request from the user application, wherein the communication protocol format is selected from a plurality of different communication protocol formats; and
   sending the formatted location data to a data forwarder for transmission to the requesting user application in the selected communication protocol format;
   wherein the data forwarder comprises a location data communication protocol format selected from a plurality of location data communication protocol formats in response to receipt of an indication of communication protocol format from the user interface manager.

7. The method of claim 6, wherein formatting further comprises:
   selecting a communication protocol format from a plurality of communication protocol formats for the location data.

8. The method of claim 7, wherein formatting further comprises selecting a NMEA protocol format from the plurality of protocol formats.

9. The method of claim 7, wherein formatting further comprises:
selecting a binary communication protocol format from the plurality of communication protocol formats.

10. The method of claim 6, further comprising:
decoding a plurality of GPS signals at a tracker;
deriving, from the plurality of GPS signals, the location data that is to be received at the host navigation processor module from the tracker interface module; and
sending the location data to the tracker interface module.

11. A system for processing positioning signals, comprising:
means for receiving at a communication interface a request from a user application of a plurality of user applications for location data formatted in a location data protocol format requested by the user application, wherein at least one user application requires a location data protocol format that is different from the location data protocol format required by the other user applications;
means for notifying a host navigation processor module and a user interface manager of the request for location data formatted in the requested location data protocol format sent by the communication interface;
means for receiving GPS-based location data at the host navigation processor module from a tracker interface module;
means for formatting the location data into the requested location data protocol format at a data forwarder as directed by the user interface manager in response to the communication interface receiving the request from the user application, wherein a location data protocol format is selected from a plurality of location data protocol formats, and wherein the location data protocol format formatted by the data forwarder is compatible with the location data protocol format of the user application selected from the plurality of user applications; and
means for sending the formatted location data to a data forwarder for transmission to the requesting user application in the selected location data protocol format;
wherein the data forwarder comprises a location data protocol format selected from a plurality of location data protocol formats in response to receipt of an indication of protocol format from the user interface manager.

12. The system of claim 11, wherein the means for formatting comprises:
means for selecting a location data protocol format from a plurality of location data protocol formats for the location data.

13. The system of claim 12, wherein the means for formatting comprises means for selecting a NMEA protocol format from the plurality of protocol formats.

14. The system of claim 12, wherein the means for formatting comprises:
means for selecting a binary location data protocol format from the plurality of location data protocol formats.

15. The system of claim 11, further comprising:
means for decoding a plurality of GPS signals at a tracker;
means for deriving, from the plurality of GPS signals, the location data that is to be received at the host navigation processor module from the tracker interface module; and
means for sending the location data to the tracker interface module.

16. A storage medium accessible by a processor, the storage medium including machine-readable instructions for processing signals in a system that processes positioning signals, the signal-bearing medium comprising:
logic for receiving at a communication interface a request from a user application of a plurality of user applications for location data formatted in a location data protocol format requested by the user application, wherein at least one user application requires a location data protocol format that is different for the location data protocol format required by the other user applications;
logic for notifying a host navigation processor module and a user interface manager of the request for location data formatted in the requested location data protocol format sent by the communication interface;
logic for receiving GPS-based location data at the host navigation processor module from a tracker interface module;
logic for formatting the location data into the requested location data protocol format at a data forwarder as directed by the user interface manager in response to the communication interface receiving the request from the user application, wherein a location data protocol format is selected from a plurality of location data protocol formats, and wherein the location data protocol format formatted by the data forwarder is compatible with the location data protocol format of the user application selected from the plurality of user applications; and
logic for sending the formatted location data to a data forwarder for transmission to the requesting user application in the selected location data protocol format;
wherein the data forwarder comprises a location data protocol format selected from a plurality of location data protocol formats in response to receipt of an indication of protocol format from the user interface manager.

17. The signal-bearing medium of claim 16, further comprising logic for selecting a NMEA protocol format from a plurality of protocol formats for the location data.

18. The storage medium of claim 16, further comprising:
logic for selecting a protocol format from a plurality of protocol formats for the location data.

19. The storage medium of claim 16, further comprising:
logic for selecting a binary protocol format from a plurality of protocol formats for the location data.

20. The storage medium of claim 16, further comprising:
logic for decoding a plurality of GPS signals at a tracker;
logic for deriving, from the plurality of GPS signals, the location data that is to be received at the host navigation processor module from the tracker interface module; and
logic for sending the location data to the tracker interface module.

21. A system for processing positioning signals, the system comprising:
a tracker including a GPS receiver configured to receive GPS signals;
a navigation processor configured to receive raw measurement data from the tracker;
a user interface manager configured to receive processed location data from the navigation processor;
a communication interface configured to receive a request for location data from a requesting user application of a plurality of user applications, and to notify the navigation processor and the user interface manager of the request for location data, wherein at least one of the user applications requires a location data protocol format different from the location data protocol format required by the other user applications; and a data forwarder configured to receive the processed location data from the user interface manager and transmit formatted location data to the requesting user application in a location data protocol format required by the requesting user application, wherein the data forwarder selects the location data protocol format from a plurality of location data protocol formats in response to the user interface, and wherein the location data protocol formatted by the data forwarder is compatible with the location data protocol format of the requesting user application selected from the plurality of user applications;

wherein the data forwarder comprises a location data protocol format selected from a plurality of location data protocol formats in response to receipt of an indication of protocol format from the user interface manager.

22. The system of claim 21, further including a host computer, the host computer including the navigation processor, the user interface manager, the communication interface, the data forwarder, and the plurality of user applications.

23. The system of claim 22, wherein the host computer further comprises a tracker interface configured to receive the raw measurement data from the tracker.

24. The system of claim 22, wherein the host computer further comprises the tracker.

25. The system of claim 21, wherein the tracker comprises a location processing circuit configured to provide the raw measurement data for transmission to the navigation processor.

26. The system of claim 21, further comprising a plurality of data forwarders, wherein the user interface manager is configured to transmit the processed location data to a selected one of the data forwarders, the selection being based on a communication received at the user interface manager from the communication interface.

27. A method for processing positioning signals, the method comprising:

receiving at a communication interface a request from a requesting user application for location data, the requesting user application being one of a plurality of user applications available for communication with the communication interface, wherein at least one of the user applications requires a location data protocol format different from the location data protocol format required by the other user applications;

notifying a navigation processor and a user interface manager of the request for location data formatted in the requested location data protocol format received by the communication interface;

receiving GPS-based location data at the navigation processor from a tracker;

processing the GPS-based location data at the navigation processor and transmitting the processed location data to the user interface manager;

based on the request received at the communication interface, configuring a data forwarder to prepare the processed location data in a location data protocol format required by the requesting user application, wherein the location data protocol format is selected from a plurality of location data protocol formats, and wherein the location data protocol format formatted by the data forwarder is compatible with the location data protocol format of the user application selected from the plurality of user applications; and transmitting formatted location data from the data forwarder to the requesting user application in the selected location data protocol format;

wherein the data forwarder comprises a location data protocol format selected from a plurality of location data protocol formats in response to receipt of an indication of protocol format from the user interface manager.

28. The method of claim 27, wherein receiving GPS based location data at the navigation processor includes receiving the GPS-based location data at a host computer that comprises the navigation processor.

29. The method of claim 27, wherein receiving GPS-based location data at the navigation processor includes receiving the GPS-based location data at a host computer that comprises the navigation processor and the tracker.

30. The method of claim 27, wherein configuring the data forwarder comprises selecting the data forwarder from a plurality of data forwarders, the selection being based on a communication received at the user interface manager from the communication interface.

\* \* \* \* \*

UNITED STATES PATENT AND TRADEMARK OFFICE
CERTIFICATE OF CORRECTION

PATENT NO. : 7,813,875 B2
APPLICATION NO. : 10/269105
DATED : October 12, 2010
INVENTOR(S) : Clifford Yamamoto et al.

It is certified that error appears in the above-identified patent and that said Letters Patent is hereby corrected as shown below:

Column 1, line 29, delete "simply" and substitute --simplify--

Column 2, line 50, delete "nodule" and substitute --module--

Column 3, line 37, delete "be"

Column 5, line 14, insert --218-- between "applications" and "may"

Column 5, line 16, delete ";" and substitute --,--

Column 5, line 22, delete "process" and substitute --processor--

Signed and Sealed this
Fifteenth Day of March, 2011

David J. Kappos
*Director of the United States Patent and Trademark Office*